United States Patent [19]

Blüthgen

[11] Patent Number: 4,501,014
[45] Date of Patent: Feb. 19, 1985

[54] METHOD FOR ELIMINATING UNWANTED ACOUSTIC SIGNALS IN AUDIO PROGRAMS TO BE EDITED FOR REPRODUCTION

[75] Inventor: Björn Blüthgen, Celle, Fed. Rep. of Germany

[73] Assignee: Polygram GmbH, Hamburg, Fed. Rep. of Germany

[21] Appl. No.: 570,413

[22] Filed: Jan. 12, 1984

Related U.S. Application Data

[63] Continuation of Ser. No. 285,546, Jul. 21, 1981, abandoned.

[30] Foreign Application Priority Data

Jul. 25, 1980 [DE] Fed. Rep. of Germany ....... 3028334

[51] Int. Cl.³ ............................................. G11B 3/00
[52] U.S. Cl. .................................................... 381/94
[58] Field of Search ..................... 375/34; 381/94, 56; 369/48, 174; 358/336

[56] References Cited

U.S. PATENT DOCUMENTS 3,700,812  10/1972  Springett ............................. 179/1 P
4,076,969  2/1978   Sacks ................................. 179/1 P X
4,208,634  6/1980   Peek et al. .......................... 179/1 P X

FOREIGN PATENT DOCUMENTS 2020080  11/1979  United Kingdom .

OTHER PUBLICATIONS

"Click Eliminator", Electronics Today International, Apr. 1979, pp. 41–46.
Trissl, "Der Scheidetisch Mit Zeitcodesteurung", Rundfunktechnischen Mitteilungen, vol. 20 (1976), No. 5, pp. 203–210.

Primary Examiner—Stafford D. Schreyer
Assistant Examiner—James L. Dwyer
Attorney, Agent, or Firm—Hill, Van Santen, Steadman & Simpson

[57] ABSTRACT

A method is proposed for eliminating or suppressing unwanted acoustic signals in audio programs to be edited for reproduction in studios, in which the perceived disrupted segments in the signal are determined with respect to their time positions, and the signal ends having signal flow/polarity changes adjacent to the disrupted signal location are bridged by a transfer function, preferably in the shape of a semi-sine. The semi-sine is stored in the form of sampling values in an addressable read-only memory and can be read therefrom. In order to generate the desired transfer function, the signals read from the read only memory are uniformly distributed over the transfer function in accordance with the plurality of sampling values to be replaced across the width of the disrupted segment, the read signals being weighted in accordance with the margin conditions of the signal ends adjacent to the disrupted segment and being inserted in the proper sequence into the signal in the area of the original disrupted segment upon consideration of the direction of signal change.

5 Claims, 5 Drawing Figures

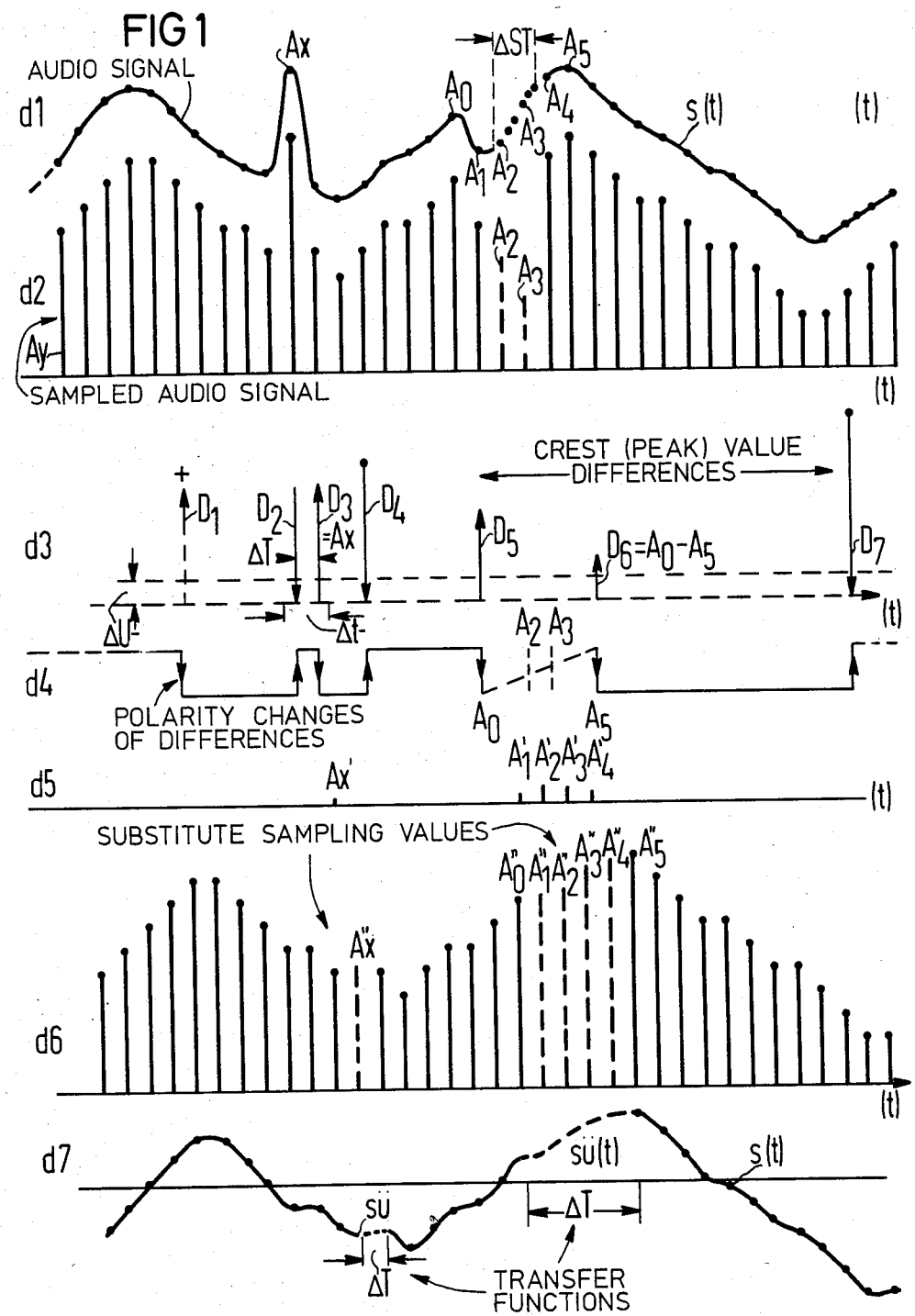

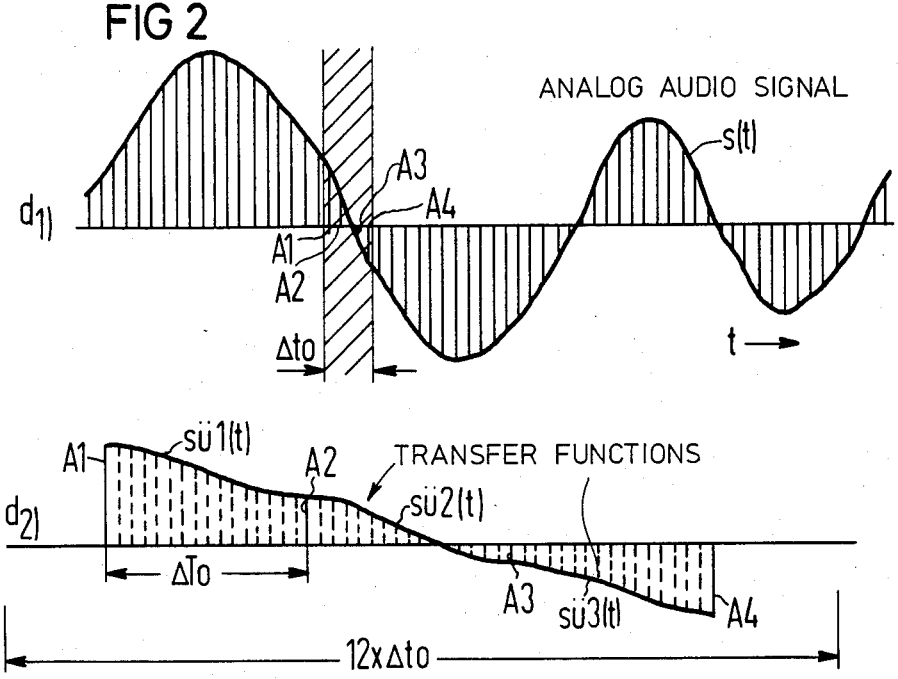
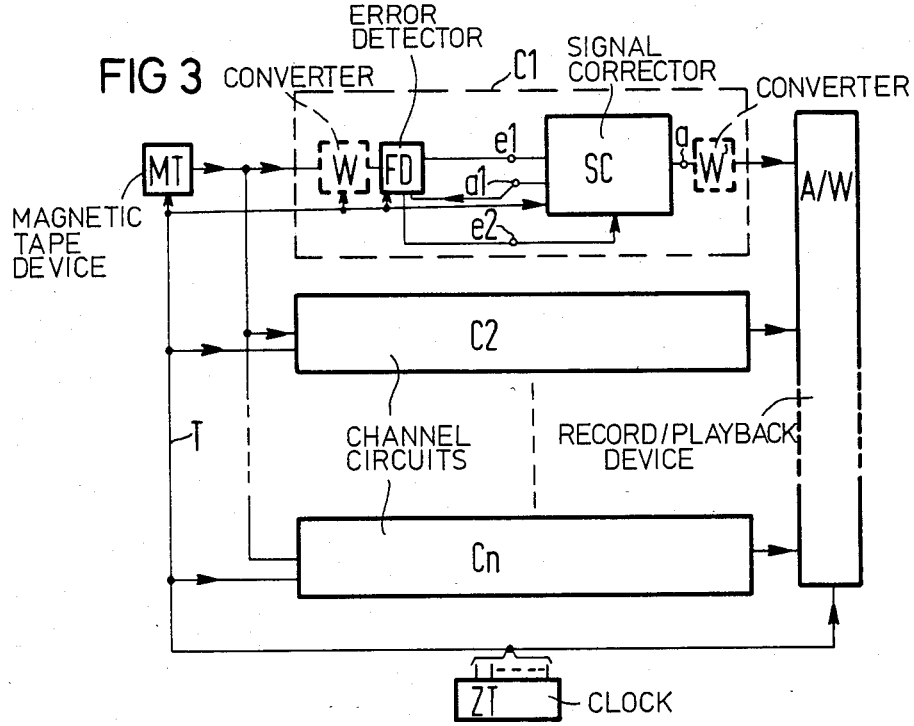

METHOD FOR ELIMINATING UNWANTED ACOUSTIC SIGNALS IN AUDIO PROGRAMS TO BE EDITED FOR REPRODUCTION

This application is a continuation of application Ser. No. 285,546, filed July 21, 1981, now abandoned.

BACKGROUND OF THE INVENTION

1. Field of the Invention

The present invention relates to a method for eliminating or suppressing unwanted acoustic signals in audio programs which are to be edited for reproduction, the unwanted signals being such signals as occur due to program-related level skips between signal drop outs, abrupt transitions, particularly from and to signal pauses, undesired signal frequencies and interfaces of two program segments to be connected.

2. Description of the Prior Art

In order to eliminate acoustically-disruptive clicking noises in the editing of audio programs, a number of possibilities come to mind. For example, given brief signal drop outs, one may interpolate intermediate values from the end values of the drop out, which intermediate values are then inserted into the signal gap. Such a method, however, only produces usable results when the level and time differences between the drop out final values are not all too great.

Further, one may fill out a brief interruption with a preceding, error-free signal portion or expand the preceding signal portion in such a manner that the disruption is bridged.

This also produces difficulties when the disruptive section exhibits a relatively great length and the level difference between the ends of the drop out is relatively large.

The above-mentioned possibilities, therefore, are only suited for the elimination of acoustic click noises given brief signal drop outs or briefly-occurring noise peaks. In contrast thereto, they are less suitable for the interference-free connection of two program segments or for disruptions which are caused due to abrupt transitions from and to the signal level zero.

SUMMARY OF THE INVENTION

The object of the present invention is to provide a method for eliminating or suppressing acoustically-disruptive clicking noises which can be applied both to various causes of interference and to interface technology, in particular, given high requirements of noise elimination of the audio signal and, in addition, which also makes its use possible independently of whether the audio program to be edited is a control automatic fade-in and/or fade-out operation to the signal level zero or from the signal level zero or, respectively, and is a matter of analog or digital signals.

According to the invention, the above object is achieved, in a method of the type generally mentioned above, in that the successive sampling values of the audio signal to be edited pass through a flow memory in which the sampling values to be eliminated between two signal flow polarity changes, together with perceived or prescribed unwanted signal sections lying therebetween, are to be replaced by sampling values of transition signals with soft junctions at both ends, which are matched to the duration of the respective intervals of such signal flow polarity changes. An addressable read only memory (ROM) containing a suitable transfer function in the form of sampling values is employed for generating the sampling values, the respectively required polarity of sampling values uniformly distributed over the course of the transfer function being read from the read only memory and being reduced and/or increased in value in accordance with a factor prescribed by the maximum signal change across the unwanted signal section, being brought into a sequence which depends on the direction of the signal change.

The invention proceeds from the perception that a brief, acoustically-perceptible disruption of an audio signal, no matter what its nature may be, can be eliminated in that the noise function itself is replaced by a suitable transfer function which is matched to the undisturbed signal, preferably to the noise-free, perceived instantaneous signal values having signal flow polarity change.

According to an advantageous feature of the invention, the transfer function is therefore advantageously a semi-sine whose polarity of stored sampling values is equal to the number of maximally-existing quantization stages or quantization stages to be required of the audio signal to be edited reduced by a certain value. By so doing, it is assured that maximum level skips from the maximum positive amplitude to the maximum negative amplitude of the signal can still be faultlessly bridged by the transfer function.

According to another feature of the invention, the method is also excellently-suited for the suppression of crackle and hissing noises given great chronological expanse of an analog or encoded audio signal which is to be edited and is undisturbed per se, for example, in a manual search for suitable interfaces, in particular in such a manner that each time-extended interval between two successive sampling values (slow-motion sampling interval) is filled by sampling values of the transfer function which follow one another in the rhythm of the normal sampling frequency.

Undesired signal sequences can likewise be filtered out of an audio program controlled by a freely-selectable $\Delta U$ and $\Delta t$ reference values.

BRIEF DESCRIPTION OF THE DRAWINGS

Other objects, features and advantages of the invention, its organization, construction and operation will be best understood from the following detailed description, taken in conjunction with the accompanying drawings, on which:

FIG. 1 is a series of timing diagrams explaining the manner of operation of the method of the present invention, to which reference will be made below;

FIG. 2 is a pair of timing diagrams setting forth the manner of operation of the method of the invention in its application to extended time scale signals;

FIG. 3 is a block circuit diagram of a studio installation having a signal correction system which makes use of the method of the invention;

DESCRIPTION OF THE PREFERRED EMBODIMENTS

Figure 4:
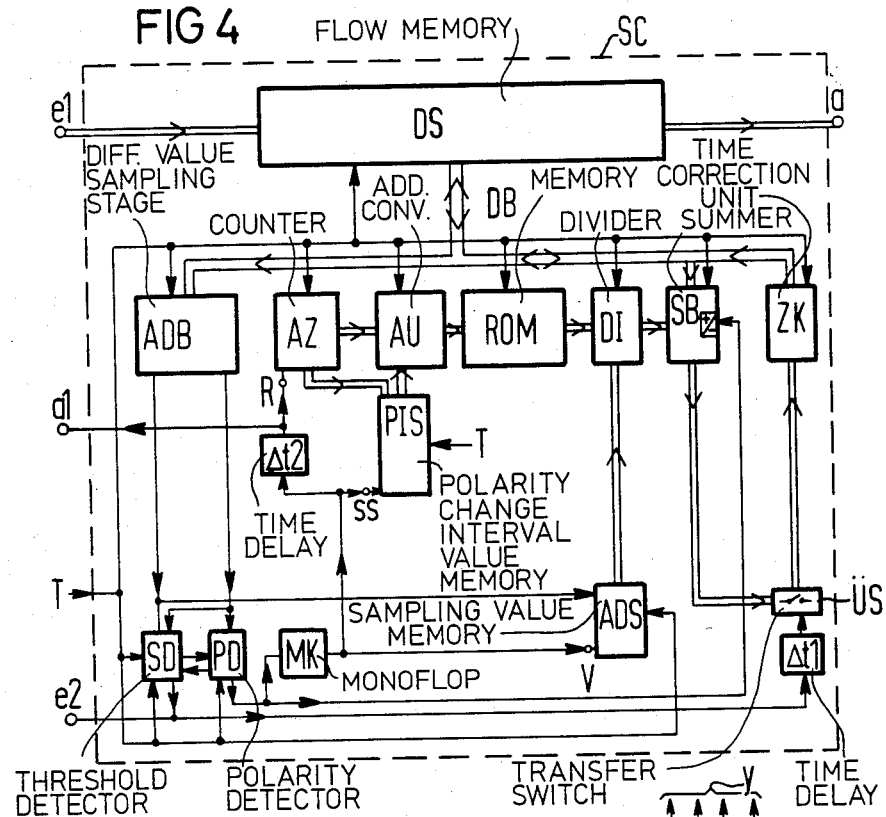
FIG. 4 is a block circuit diagram of a signal corrector according to FIG. 3, shown in greater detail.

In FIG. 1, seven timing diagrams d1–d7 are illustrated below one another to show the individual method steps in the elimination of acoustically-disruptive click noises in the editing of programs. With respect to time, the timing diagram d1 shows an analog audio signal s(t) which has two disrupted locations, in particular, a disrupted location having a width ΔST and a noise level peak Ax. The disrupted location is here illustrated as a brief signal interruption. This disrupted location could also represent the location of an original interference peak which has already been suppressed in an error detector which the signal has traversed. The disrupted location having a time width ΔST for the duration of two sampling values A2 and A3 as illustrated in the example is now to be bridged, according to the invention, by a soft transfer function. By analogy, the filtering-out of the interference peak A occurs in the same manner.

The audio signal s(t) illustrated in the diagram d1 can be stored in the form indicated on the magnetic tape or in an analog form or in a digital form. In order to bridge the disrupted location or, respectively, the interference peak, sampling values are now formed given an analog signal in the timing of the sampling frequency which is illustrated in the diagram d2. As the diagram d3 shows, differential values $D_1-D_7$ are formed from the sampling values Ay from crest values derived from polarity changes and, in the diagram d4, the polarity change is determined in the sequence of these differential values.

The diagram d3 likewise shows threshold values ΔU reference and Δt reference, as reference values for prescribed noise peaks in the audio signal which, therefore, are to be filtered out. When, as illustrated in the diagram d1, disruptive sampling values A2 and A3 are perceived between signal flow polarity changes and $A_0/A_1$ and $A_4/A_5$ which are free of unwanted signals, then the sampling values $A_1-A_4$ according to the diagram d1 are replaced by such sampling values of a soft transfer function after, first, the differential value $D_6=A_0-A_5$ has also been formed in accordance with the diagram d3 from the undisrupted sampling values $A_0$ and $A_5$, the change of direction of the overall change of the transfer function bridging the disrupted location being determined from its amplitude and operational sign characterized by the directions of the arrows. The reference sampling values for the prescribed interference peak Ax in the example illustrated is the respective sampling value immediately preceding or following Ax.

The sampling values of the transfer function representing a semi-sine which are stored in a read only memory in the form of sampling values are now read in the required plurality—four in the present example—from the read only memory in uniformly-distributed spacing over the semi-sine function and, upon consideration of the differential value $D_6$, are modified according to the diagram d5 into the differential sampling values $A'_1$, $A'_2$, $A'_3$ and $A'_4$. By the sum formation of this sequence of differential sampling values $A'_1-A'_4$, proceeding from the sampling value $A_0$, the sampling values $A''_1$, $A''_2$, $A''_3$ and $A''_4$ are obtained which are then inserted into the sampling sequence instead of the disrupted sampling values $A_1-A_4$, according to FIG. 2 and in accordance with the diagram d6.

The analog audio signal s(t)' represented by the sampling sequence in the diagram d6 is illustrated in the diagram d7 in which the transfer function su(t) in the form of a semi-sine is emphasized with a broken line. The disruption according to the diagram d1 given by the sampling value Ax is perceived as an interference peak in that the appertaining interval of the signal flow polarity change with the time width ΔT is smaller than the Δt reference. The sampling difference read from the read only memory here is referenced in the diagram d5 with Ax'. By means of the sum formation already described, the sampling value Ax" illustrated in the diagram d6 is then obtained. The appertaining transfer function su in the diagram d7 here practically degenerates into a transition value section.

If the audio signal to be edited exists in the form of a digital signal, then, instead of the sampling values Ay according to the diagram d3 and the subsequent differential formation of the sampling values, one can proceed directly on the digital level, i.e. by the differential formation of the code words which represent the sampling values and follow one another in the signal. The differential sampling values $A'_1$, $A'_2$, $A'_3$ and $A'_4$ according to the diagram d5 or, respectively, the sampling values $A''_1$, $A''_2$, $A''_3$ and $A''_4$ according to the diagram d6 can then also be directly generated as differential code words or, respectively, code words in the same manner.

The same method can also be employed given abrupt transitions from and to signal pauses. Here, also, the click which is thereby audible and disruptive is indicated by differential values of sampling sequences after a polarity change which falls below the threshold value ±U which can just still be tolerated, for a time which is greater than or equal to the Δt reference (defined as a signal pause). An error detector is employed to perceive the signal pause and, thus, indicates that the respective differential value is equal to the differential value indicating the faulty transition in terms of operational sign and magnitude. Therefore, transfer function sampling values for signal pause transitions to the duration of a semi-sine can then be generated for the lower system cutoff frequency.

The timing diagrams of FIG. 2 illustrate a further development of the method according to the invention in its application to signals having a greatly-extended time scale as can be employed for manual interface locating, for example, in matching two program segments to one another. When the audio signal exists in the form of sampling values, as is particularly the case given digital audio signals, then, due to the abrupt transitions between two successive sampling values, acoustically-disruptive noises occur. Such noises can likewise be suppressed by a soft transfer function between two successive sampling values, whereby one proceeds in the same manner in order to obtain this transfer function as has already been explained on the basis of the timing diagrams according to FIG. 1. Instead of the transfer function between the sampling values surrounding a disruptive location with signal flow polarity change allocation, the intervening space between two successive signal level values perceived as sampling values is filled with the sampling values of the semi-sine contained in the read only memory in the form of intermediate values.

The timing diagram $d_1$ according to FIG. 2 again first illustrates an analog audio signal s(t) which is to be greatly extended in time scale in the area of its sampling values A1, A2, A3 and A4, in particular, in the slow-motion interval to for a manually adjustable interface determination. It is only by way of example that an extended time scale 12 × Δto is illustrated in the timing diagram $d_2$. The slow-motion sampling intervals ΔTo between the sampling values A1 and A2 or, respectively, A2 and A3 or, respectively, A3 and A4 are now bridged by the transfer function su1(t), su2(t) and su3(t)

which are formed by sampling values indicated with broken lines. The sampling frequency of the sampling values of these transfer functions is identical to the sampling frequency of the sampling values of the audio signal s(t) according to the diagram $d_1$. Therefore, it is achieved in an extremely advantageous manner that no disruptive acoustical extraneous noise occurs, even given greatly-extended time scales and, therefore, the possibility of very slow transitions from one sampling value to the next and, therefore, the desired interface can be determined without error simply by means of listening to the signal at a very slow tape speed.

The studio installation schematically illustrated in block circuit diagram form in FIG. 3 for editing audio programs comprises a magnetic tape device MT on the transmitter side having n signal tracks. The audio signal recorded in the individual tracks are separately supplied to n channel circuits C1, C2, . . . Cn. At the output side, the channel circuits C are connected to a record/playback device A/W in which the signals can be further processed. The magnetic tape device MT, the channel circuits C and the record/playback device A/W are supplied by way of a central clock supply ZT with a clock T which generally comprises various pulse sequences. As the channel circuit C1, which is illustrated in greater detail, shows, each channel circuit comprises an error detector FD at the input side which can, under certain conditions, be preceded by a converter W (shown in broken lines). The error detector FD detects noise and no-signal portions and sets a flag accordingly. With its two outputs and its further input, the error detector FD is connected to the two inputs e1 and e2 and to the output a1 of a signal corrector SC whose further output a, again under certain conditions, is connected by way of a further converter W' (also shown in broken lines) to the appertaining input of the record/playback device A/W. The converters W and W', which are respectively analog/digital and digital/analog converters, are necessary when the recording of the audio signals on the n tracks of a magnetic tape device MT is undertaken on an analog basis. In digital recording, in the form of pulse code modulated (PCM) code words representing the sampling values of the original analog audio signal, the converters are not necessary since the error-compensating editing of an audio signal in the signal corrector SC can be directly executed on a digital basis. The signal at the output a1 of the error corrector SC is further transmitted, via the error detector FD, to the input e2 of the signal corrector SC under the assumption that an error recognition has taken place. This signal is time mark which activates the transfer switch US (FIG. 4) on time for the insertion of the sampling values of the time response or transfer function via a time correction unit ZK (FIG. 4).

As the more detailed block diagram of the signal corrector SC of FIG. 4 shows, the signal corrector exhibits a flow memory DS between its input e1 and its output a. The flow memory DS may be a shift register, or other digital memory having a serial input and serial output and a fixed delay time. The flow memory DS allows a disrupted signal section, including the undisrupted sampling values surrounding the disturbed section between two signal flow polarity changes to be bridged by a transfer function during its passage therethrough in the manner described above in conjunction with FIGS. 1 and 2.

The flow memory DS is connected by way of a data bus DB to a plurality of devices, namely, to a differential sampling value formation stage ADB, a sum formation stage SB and the aforementioned time correction unit ZK. First, differential values Dy are continuously formed from the incoming sampling values of the audio signal at the input side of the flow memory DS, being formed from the sampling values Ay in accordance with the diagram d2 of FIG. 1, and these values are supplied, on the one hand, to a threshold detector SD for evaluation according to the diagram d3 of FIG. 1 and, on the other hand, to the polarity detector PD in order to determine a change of polarity. The polarity detector PD generates differential values either as a function of threshold transgressions reported by the threshold detector SD or, respectively, from the sampled signal flow change/peak values having disturbed locations identified therebetween and, upon occurrence of a polarity change, generates an output signal which, on the one hand, relays the polarity of these differential values to the polarity input of the sum formation stage SB and, on the other hand, respectively switches a monostable multivibrator MK from its quiescent state into its astable state. The period of the monostable multivibrator MK is to form a pulse having a length which is sufficient for reliable operation of a differential sampling value memory ADS and a signal flow/polarity change/interval memory PIS, as will be understood below.

The output pulse of the monostable flip-flop MK serves for activating the differential sampling value memory ADS and the signal flow/polarity change/interval memory PIS. In this manner, the differential sampling values marked by polarity changes which exceed the threshold of the threshold detector SD for application as a prescribed interference peak filter, the differential sampling values appearing at the output of the differential sampling value formation stage ADB which is connected to the input of the differential sampling value memory ADS, are written into the differential sampling value memory and the differential values $D_1-D_7$ according to the timing diagram d3 of FIG. 1 are formed therefrom. The differential values produced in this manner are supplied to an input of a divider DI which has a second input connected to the output of an addressable read only memory ROM containing the transfer function in the form of sampling values.

With a write pulse ss from the output of the monostable flip-flop MK, the signal flow/polarity change interval memory PIS stores the respective most recent counter reading of a sampling frequency counter AZ before it is reset by way of its reset input R. At the same time, the pulse at the output of the monostable flip-flop MK is employed in order to return the sampling frequency counter AZ into its initial position by way of the reset input R after a sufficiently long time. To this end, the output pulse of the monostable flip-flop MK is fed to the reset input R by way of a time delay element $\Delta t2$. The delay time is sufficient enough to ensure loading of the memory PIS prior to resetting of the counter AZ.

The memory PIS contains the interval between two polarity changes, which include a malfunction as well as an indication regarding the position of the interval in the signal flow. With the output of the polarity detector PD, the output of the signal flow/polarity change/interval memory PIS, and the output of the differential sampling value memory ADS, all of the variables are available which are required for the generation of the sampling values $A''_1, A''_2, A''_3$ and $A''_4$ according to the timing diagram d6 of FIG. 1, from the sampling values of the transfer function stored in the read only memory ROM in the form of a semi-sine.

Together with the output signal of the sampling frequency counter AZ, the output signal of the signal flow/polarity change/interval memory PIS controls the code conversion of the required polarity of sampling values in an address converter AU. The sampling frequency counter AZ, as mentioned above, is reset by way of its reset input R, by the output pulse of the time delay element $\Delta t2$. At the same time, this pulse is transmitted by way of the output a1 to the error detector FD in which it is indirectly employed for the control of the insertion operation of the generated sampling values of the transfer function into the appertaining memory locations of the flow memory DS. The signal corrector SC receives the control pulse for this insertion operation by way of its input e2.

Based on the number of sampling values to be replaced and supplied thereto from the sampling frequency counter AZ, the address converter AU determines the sampling values stored in the read only memory ROM suitable for this purpose and causes the same to be transferred to the divider DI. In the divider, the sampling values read from the read only memory ROM are divided by the amount of the differential value $D_6$ according to the timing diagram d3 of FIG. 1 and, subsequently, the differential sampling values $A''_1$, $A''_2$, $A''_3$ and $A''_4$ according to the timing diagram d6 of FIG. 1 obtained in that manner are added in the sum formation stage SB in the proper sequence to form the sampling values $A41_1$, $A''_2$, $A''_3$ and $A''_4$, upon consideration of the direction of change of the signal and proceeding from a base value $A''_0$. With the assistance of the transfer switch US and by way of the time corrector ZK, the obtained sampling values at the output of the sum formation stage SB are inserted into the memory locations within the flow memory DS which are assigned thereto, so that the audio signal, now rid of noise, is available at the output a in the sampling value representation according to the timing diagram d7 of FIG. 1. The time corrector ZK therefore operates to delay introduction of the transfer function until the correct position is reached by the data in the flow memory DS. The time corrector ZK fades-in the sampling values of the transfer function in accordance with a clock operation into the signal flow which is traversing the flow memory (shift register) DS. The actuation of the transfer switch US occurs by way of the signal of the error detector FD according to FIG. 3 at the input e2 of the signal corrector SC or, respectively, given a prescribed threshold value, by way of the threshold value detector SD, and becomes effective by way of a time delay element $\Delta t1$ (which may be a delay line, as may the delay element $\Delta t2$, to bridge the signal transit time through the flow memory DS) at the control input of the transfer switch US. In other words, the threshold value detector is responsible for the recognition and suppression of interference peaks, such as the peak Ax of FIG. 1. For this purpose, it likewise receives the sampling frequency clock by way of which it is placed in a position to determine whether the time $\Delta T$ between two successive polarity changes lies within the time window formed by the $\Delta t$ reference or not given simultaneous transgression of the predetermined threshold $\Delta U$.

Figure 5:
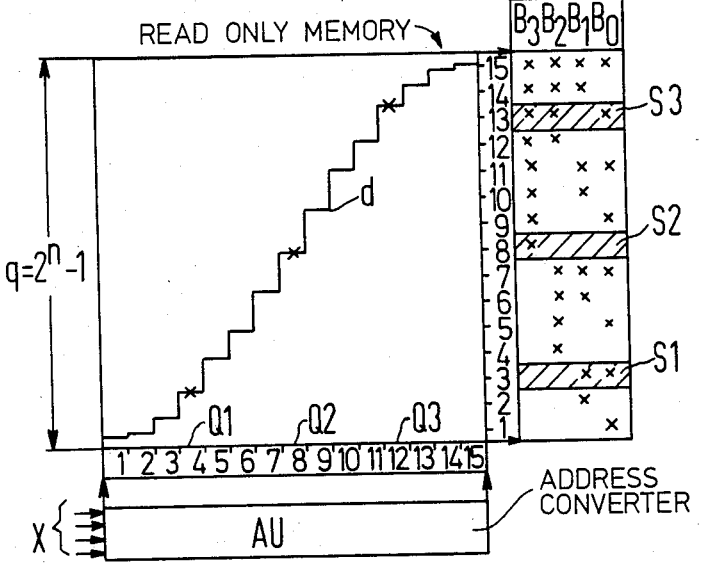
FIG. 5 is a graphic illustration explaining the operation of the read only memory in the block diagram of FIG. 4.

FIG. 5 is a graphic illustration of a more detailed explanation of the read only memory ROM, in which the transfer function in the form of a semi-sine, which is thereby approximated, is entered over the number of sampling values, which here amounts to 15. In the quantization of this semi-sine for $$q = 2^4 - 1$$

quantization stages, which is employed here by way of example, the 15 sampling values respectively exhibiting 4 bits are produced in the form of PCM words from the binary places B0, B1, B2 and B3. The address converter AU receives the information that the transfer function is to be realized by three sampling values at its input X from the samplin frequency counter AZ in accordance with FIG. 1 Therefrom, the address converter determines three sampling values Q1, Q2 and Q3 which are uniformly distributed over the semi-sine, which values are then emitted in the form of the 4-bit PCM words S1, S2 and S3 at an output Y towards the divider DI. If, for example, the sampling frequency counter AZ had reported the numeral 2 at the input X of the address converter AU, then the address converter would have intended the sampling values corresponding to the numerals 5 and 11 for the output Y.

In practice, code words having a significantly higher bit number will be employed in view of the high requirements. For the planned digital storage of audio signals, for example, a 14-bit code is intended. In adaptation thereto, the transfer function stored in the read only memory ROM must have a correspondingly fine quantization in its sampling values. Given a binary code of 14 elements, this means that the read only memory ROM must contain the transfer function in the shape of 16,388 sampling values. In other words, the plurality of semi-sine sampling values stored by the read only memory ROM preferably corresponds to the quotient proceeding from the sampling frequency reduced by a value divided by the lower cut-off frequency of the transfer channel. Although I have described my invention by reference to specific examples thereof, many changes and modifications of the invention may become apparent to those skilled in the art without departing from the spirit and scope of the invention. I therefore intend to include within the patent warranted hereon all such changes and modifications as may reasonably and properly be included within the scope of my contribution to the art.

I claim:

1. A method for suppressing unwanted acoustical signals in audio programs to be edited for reproduction, if unwanted signals occur, and for connecting audio signals immediately preceding and following said unwanted signals, such unwanted acoustical signals including abrupt signal level discontinuities, comprising the steps of:

storing predetermined values in memory corresponding to amplitudes of transition signals, detecting a signal level discontinuity, sampling an audio signal of said audio program between successive signal flow/polarity changes in such signal, preceding and following the detected discontinuity, to produce a plurality of sample values between said two successive signal flow/polarity changes, reading said predetermined stored values corresponding to amplitudes of transition signals and manifesting the same as a plurality of equally distributed values corresponding to a transfer function forming smooth transitions with said preceding and following audio signals; modifying the amplitudes of the said values read from said memory in accordance with the amplitude change between the preceding and following audio signals; whereby said modified values correspond to a transfer function smoothly connecting the preceding and following audio signals; delaying the sampled audio signals, and inserting, when a said discontinuity is detected, the modified values into the delayed audio signals, whereby the sample values between said two signal flow/polarity changes in the region of a discontinuity are replaced with transition signals having a smooth transition with respect to the preceding and succeeding audio signals, said transition signals being matched to the time interval between the signal flow/polarity changes.

2. The method according to claim 1, wherein said step of detecting a signal discontinuity, when such discontinuity is in the form of an interference peak, comprises;

detecting a time interval between signal flow/polarity changes having a duration which is less than a predetermined interval of time, and simultaneously detecting whether the difference in levels of said audio signal at the beginning and end of such time interval between signal flow/polarity changes exceed a predetermined value, and wherein, when said time interval is less than said predetermined interval or said difference does not exceed said predetermined value, said inserting step comprises inserting a transfer function in the form of a single modified value to replace said interference peak.

3. The method of claim 1, wherein said stored values corresponding to said transition signals comprise amplitude values of a half cycle of a sine wave.

4. The method according to claim 1, including the steps of detecting a discontinuity in said audio signal in response to said sampling prior to delaying such signal, forming difference values corresponding to the difference between successive sample values in response to the instantaneous level of said audio signal, producing signals indicative of signal flow/polarity changes in response to said difference values, and for smoothly joining said audio signal in the region of said flow/polarity changes in response to whether the change in amplitude of said audio signal immediately preceding and following said discontinuities exceeds a predetermined level.

5. The method according to claim 1, wherein said audio signal comprises an analog signal, and including the step of manifesting said modified values as analog signals after said modified values have been inserted into said audio signal.

* * * * *